(12) United States Patent
Lebouchard et al.

(10) Patent No.: US 6,723,468 B2
(45) Date of Patent: Apr. 20, 2004

(54) INTERNAL CONNECTION SYSTEM FOR HIGH POWER ELECTROCHEMICAL CELL

(75) Inventors: Gilles Lebouchard, Mosnac (FR); Stéphane Payen, Nersac (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/142,898

(22) Filed: May 13, 2002

(65) Prior Publication Data
US 2002/0168565 A1 Nov. 14, 2002

(30) Foreign Application Priority Data
May 14, 2001 (FR) ............................................. 01 06305

(51) Int. Cl.[7] .......................... H01M 2/22; H01M 2/26; H01M 6/10
(52) U.S. Cl. ........................... 429/161; 429/94; 429/211
(58) Field of Search ............................ 429/161, 94, 211

(56) References Cited

U.S. PATENT DOCUMENTS 3,505,121 A * 4/1970 Bougaran ................... 219/107
3,837,925 A 9/1974 Cailley et al.

FOREIGN PATENT DOCUMENTS

| EP | 0 545 906 A2 | 6/1993 |
| EP | 0 921 581 A1 | 6/1999 |
| EP | 0 969 538 A1 | 1/2000 |
| EP | 1 076 371 A1 | 2/2001 |
| JP | 60-115153 A | 6/1985 |
| JP | 4-162350 A | 6/1992 |
| JP | 11-297301 A | 10/1999 |
| JP | 2000-58024 A | 2/2000 |
| JP | 2000-100415 A | 4/2000 |
| JP | 2000-195496 A | 7/2000 |

* cited by examiner

Primary Examiner—Gregg Cantelmo
(74) Attorney, Agent, or Firm—Sughrue Mion, PLLC

(57) ABSTRACT

The present invention relates to an electrical storage cell (1) comprising a positive terminal (5), a negative terminal (4), a positive electrode (8) and a negative electrode (9) electrically connected to the positive terminal and to the negative terminal, respectively. Additionally, there is a collector of a first polarity (20) having a plane part (21) is electrically connected to the electrode of the first polarity, and bent electrical connection means (26) connecting the plane of the collector to the terminal of the first polarity and having a bending radius of curvature less than that of a part having the same thickness as the plane part. The invention also relates to the method of assembling this kind of electrical storage cell.

25 Claims, 6 Drawing Sheets

INTERNAL CONNECTION SYSTEM FOR HIGH POWER ELECTROCHEMICAL CELL

BACKGROUND OF THE INVENTION

1. Field of the Invention

The invention relates to high-power electrical storage cells, more particularly to high-power cylindrical cells, able to supply a discharge current representing 20 times the current needed to discharge the cell in one hour, for example. These cells generally have a diameter of 20 mm or more, in particular in formats usually called "KR14" ("R14" or "C") and KR20 ("R20" or "D"). These formats are defined in the standard CRI/IRC 285§3.1. To be more precise, the invention relates to the electrical connection between the electrodes and the terminals of this kind of cell.

2. Description of the Related Art

Conventional cylindrical storage cells generally have an electrode assembly that is wound in a spiral to form a spool. The spiral winding then includes two electrodes, respectively of positive and negative polarity, and a separator between them. The cells have connections taking the form of rectangular tongues that emerge from the spool. One end of the connection is welded to the conductive support of one of the electrodes and the other end is connected to a current outlet terminal.

The document U.S. Pat. No. 4,009,053 describes an electrical storage cell including electrodes that are wound in a spiral to form a spool. The end of the spool is formed by the edge of the electrodes. The electrodes of the same polarity are connected to a current collector via their edges, which come into contact with projections formed in radial slots of the current collector. The connection between an electrode and a collector is therefore obtained by means of a pressed contact. However, this type of contact is not suitable for high discharge currents.

The document DE-A-301 91 86 discloses a gas-tight electrical storage cell having electrodes wound in a spiral electrically connected to a conductive disk. The conductive disk takes the form of a thin and flexible metal plate and is provided with a tongue which is attached to it and curved against it at an acute angle. The tongue is fixedly connected to the interior face of the lid of the storage cell. Oblique fins are formed on both sides of the tongue and are folded. The tongue can therefore be pressed onto the conductive disk in an elastic manner by means of the fins. The internal electrical resistance of the storage cell is high, however.

The document EP-B-0 545 906 discloses an alkaline electrolyte storage cell comprising a positive electrode, a negative electrode, a separator, a container providing a negative electrode and incorporating an opening, a lid covering the opening and providing a positive terminal, a current collector for the negative electrode, and a current collector for the positive electrode. The positive and negative electrodes are formed of plates wound in a spiral. The separator is disposed between the electrodes. The current collector of the negative electrode connects one end of the negative electrode to the container and the current collector of the positive electrode connects one end of the positive electrode to the lid. The current collector of the positive electrode has a collector portion connected to the end of the positive electrode and a conductive tongue connected to the lid. The conductive tongue has a thickness (0.5 mm) greater than that (0.15 mm) of the collector part to reduce the internal electrical resistance. The above document mentions the possibility of placing two collectors of standard thickness (0.15 mm) between the electrode and the lid. Each collector comprises a conductive half-disk with a conductive tongue on top. This halves the current in each connection, and the internal resistance is reduced by 20%. The above document also proposes increasing the thickness of the connection, but this solution gives rise to problems with welding the conductive disk and with bending when closing the lid.

The electrical storage cells described in DE-A-301 91 86 and EP-B-0 545 906 have further drawbacks. In these cells, the impedance is reduced only at the level of the conductive tongue. Accordingly, this kind of cell has a high electrical resistance at the connection of the electrodes to the terminals of the cells. This resistance causes large voltage drops when high currents are supplied and this makes the cell unsuitable for some applications, in particular when the diameter of the cell exceeds 20 mm. Also, this resistance causes internal heating of the cell, which reduces its service life.

During fabrication, assembling storage cells incorporating a collector with a tongue is also difficult. On the one hand, welding a tongue to the lid is difficult. On the other hand, closing the storage cell, after connecting the tongue to a terminal, is effected by bending the tongue. The increased cross section of the tongue makes it more rigid. Bending the tongue then damages it or damages the weld to the edge of the electrode.

BRIEF SUMMARY OF THE INVENTION

The invention proposes a solution to the above problems. Thus it proposes an electrical storage cell having reduced electrical resistance where the electrodes are connected to the terminals and a method of assembling the cell.

The invention also proposes an electrical storage cell and a method of assembling it that facilitates connecting a collector to an electrode. The connection is not damaged during assembly, but has a low electrical resistance.

To be more precise, the invention relates to an electrical storage cell including a positive terminal and a negative terminal, a positive electrode electrically connected to the positive terminal, a negative electrode electrically connected to the negative terminal, a collector of a first polarity having a plane part electrically connected to one of the electrodes, and flexible electrical connection means connecting said plane part to a terminal of said first polarity and having a minimum radius of curvature for bending on a support less than that of a part having the same thickness as the plane part of the collector.

In one embodiment of the invention the electrical connection means comprise a plurality of superposed flexible conductors electrically connecting the collector to the terminal of the first polarity.

In one embodiment the flexible conductors are in the form of laminations.

Each flexible conductor preferably has a thickness less than the average thickness of the plane part of the collector.

Each flexible conductor preferably has a thickness from 50 to 250 micrometers.

In one embodiment the flexible conductors are made of nickel or nickel-plated steel.

The flexible conductors can be bent to an S-shape.

In one embodiment the collector further includes a tongue projecting from its plane part.

In a further embodiment the tongue is more rigid than each flexible conductor.

In a still further embodiment the flexible conductors are welded on the one hand to the plane part of the collector and on the other hand to one end of the tongue.

In one embodiment electrical storage cell further comprises a collector of a second polarity electrically connected to the electrode of the second polarity and having a tongue electrically connecting it to the terminal of the second polarity.

In one embodiment the collector of the second polarity comprises two plates each having an area of connection with the electrode of the second polarity and the two plates are electrically isolated from each other in their connection areas.

In one embodiment the plates are electrically connected by a connection having an electrical resistance greater than the connection of the plates via the electrode of the second polarity.

In one embodiment the plates are connected by a tongue.

In one embodiment a bridge electrically connects the connection areas of the plates.

In one embodiment a bridge electrically connects one plate to a central cutout in the other plate.

In one embodiment the bridge is a projection on a plate that is bent and electrically connected to the other plate.

In one embodiment the first polarity is positive.

The invention also provides a method of fabricating an electrical storage cell, the method including the following steps:
  supplying positive and negative electrodes,
  supplying spiral-wound positive and negative electrodes,
  supplying a collector of a first polarity having a plane part, and
  welding the plane part of the collector to the terminal of the first polarity by means of a plurality of laminations.

In one embodiment the welding is effected by means of a laser beam.

In one embodiment the method further includes a step of welding the collector to an edge of the electrode of the first polarity.

The invention further provides a method of fabricating an electrical storage cell, including the following steps:
  supplying a negative terminal in the form of a container and a positive terminal,
  supplying spiral-wound positive and negative electrodes,
  supplying a negative collector comprising two plates each having an area of connection with the negative electrode, which two connection areas are electrically isolated from each other,
  welding the connection areas of the plates to the negative electrode,
  inserting the assembly comprising the electrodes and the negative collector into the container, and
  welding the negative collector to the container.

In one embodiment a plate of the collector has a central cut-out, and the method further comprises a step of welding a bridge to the central cut-out of the plate and to the other plate after the step of welding the plates to the negative electrode.

In one embodiment a plate of the collector has a central cut-out, the method further comprising the steps of:
  welding a bridge to a plate without leaving the bridge in contact with the other plate before welding the plates to the negative electrode and,
  welding the bridge to the other plate after welding the plates to the negative electrode.

In one embodiment of the invention the method further includes a step of welding the bridge to the container.

In one embodiment of the invention the method further includes a step of welding a bridge to the respective connection areas of the plates.

The welding of the bridge and of the container to the collector can be carried out simultaneously.

In one embodiment of the invention the bridge is welded to the collector by a blind weld.

In one embodiment of the invention the method further includes the steps of:
  bending a projection of one plate to bring it into contact with the connection area of the other plate after welding the plates to the negative electrode and,
  welding the projection to the other plate.

In one embodiment of the invention, the step of welding the plates of the collector of the negative electrode includes pressing the plates against an edge of the negative electrode, pressing a welding electrode onto each plate, and passing a welding current between the welding electrodes.

BRIEF DESCRIPTION OF THE DRAWINGS

Other features and advantages of the invention will become apparent on reading the following description of an embodiment of the invention described by way of example and with reference to the drawings, in which.

DETAILED DESCRIPTION OF THE INVENTION

Figure 1:
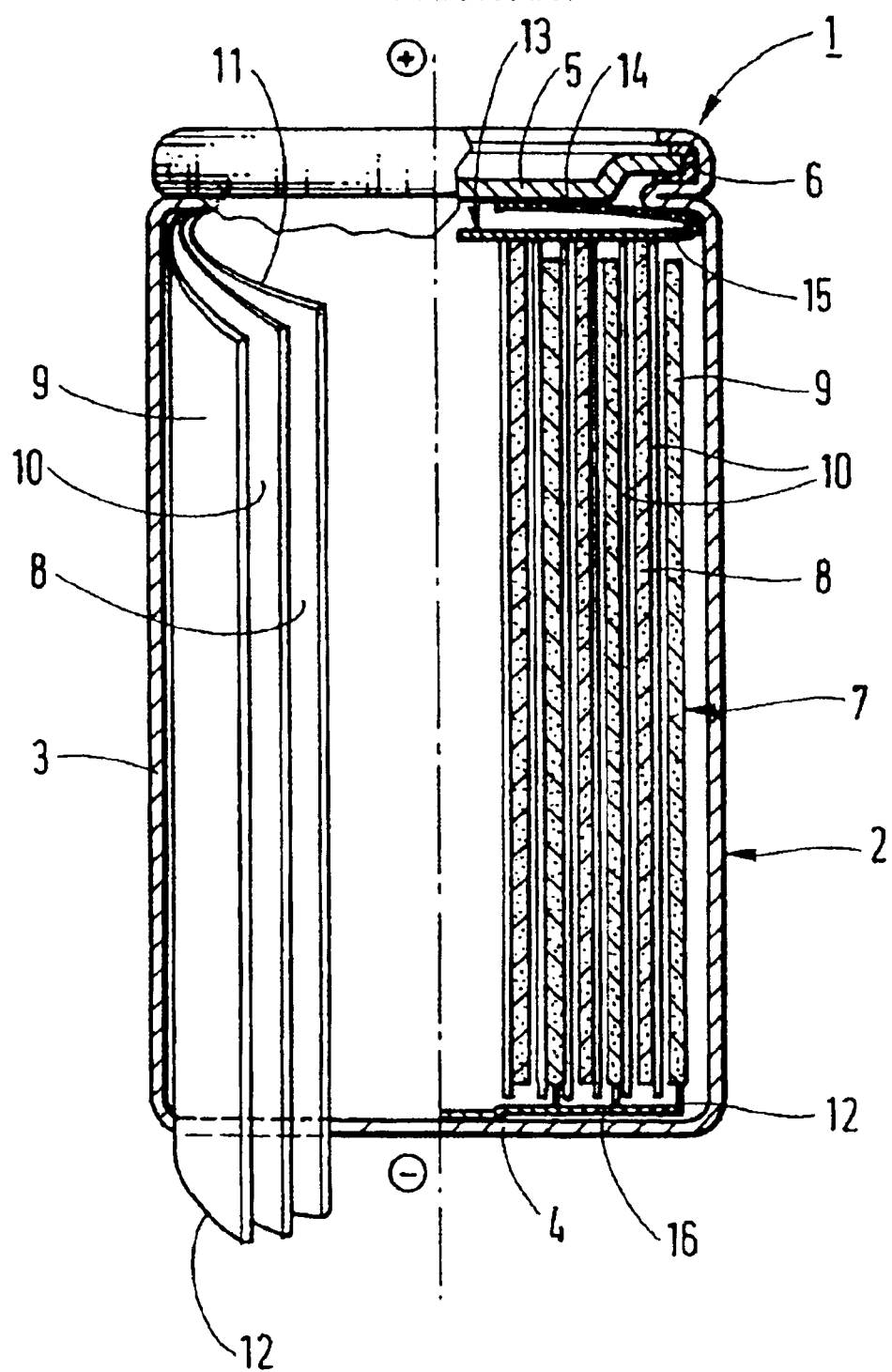
FIG. 1 is a view in partial section of a prior art low-power electrical storage cell.

FIG. 1 shows a prior art electrical storage cell in which the collector connected to the positive terminal does not allow a high current to flow. The storage cell 1 includes a container 2 having a cylindrical wall 3 closed by a bottom 4 at one end. The cylindrical wall 3 is open at the other end. A lid 5 closes the open end and is crimped to the container 2. Electrical insulation and a seal between the container 2 and the lid 5 are provided by a plastics material (for example polyamide or polysulfone) seal 6.

A spool 7 is inserted into the container 2 and includes a sintered or pasted positive electrode 8 based on nickel hydroxide and a pasted or plasticized negative electrode 9. There is a separator 10 between the electrodes 8 and 9. The electrodes are wound in a spiral. The positive electrode 8 and the negative electrode 9 are slightly offset in the direction of their height. Accordingly, when the electrodes are wound in a spiral, one end of the spool is formed by the edge 11 of the positive electrode 8 and the opposite end is formed by the edge 2 of the negative electrode 9. The lid 5 provides a positive terminal of the electrical storage cell and the bottom 4 provides a negative terminal. The positive electrode 8 is electrically connected to a conductive collector 13 including a tongue 14 and a plane part 15 of the same thickness, of the order of 0.2 to 0.3 mm. The tongue 14 is electrically connected to a conductive collector 16 in contact with the bottom 4 of the container 2.

The invention proposes an electrical storage cell in which a collector is connected to a terminal by a flexible connection having a large conductive cross section. This feature is obtained by using multiple superposed flexible conductors connecting the collector to the terminal, for example.

Figure 2:
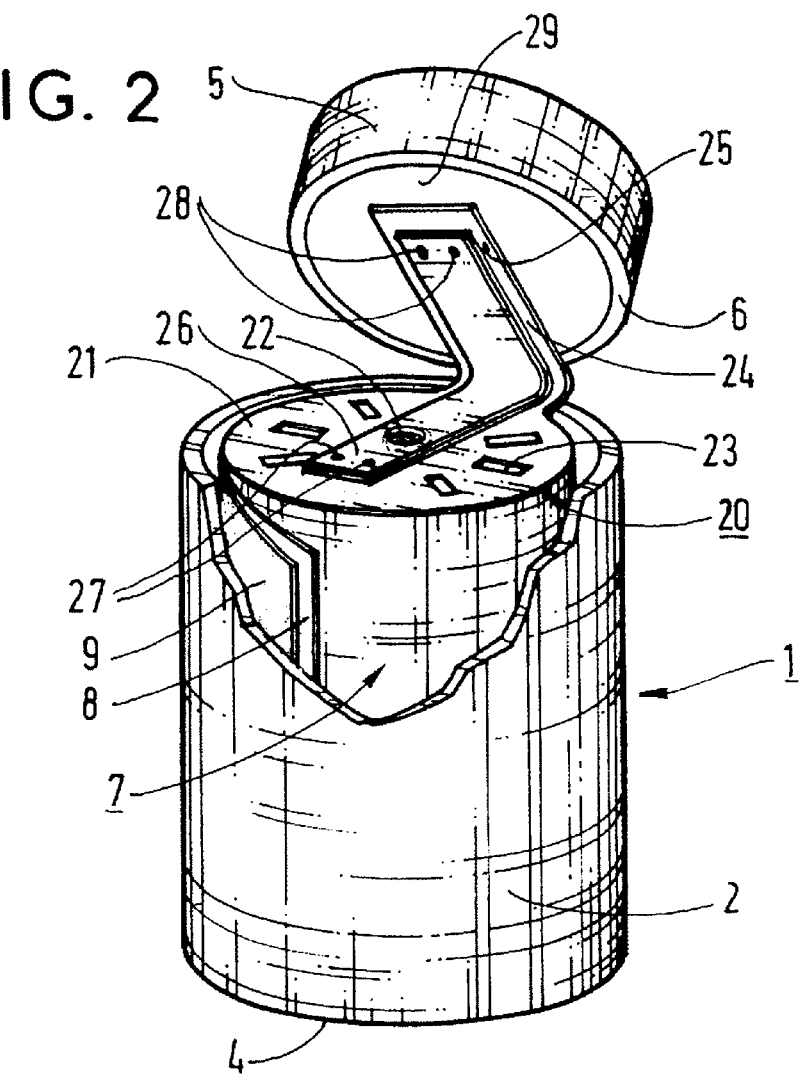
FIG. 2 is a perspective view of a first embodiment of an electrical storage cell in accordance with the invention.
Figure 3:
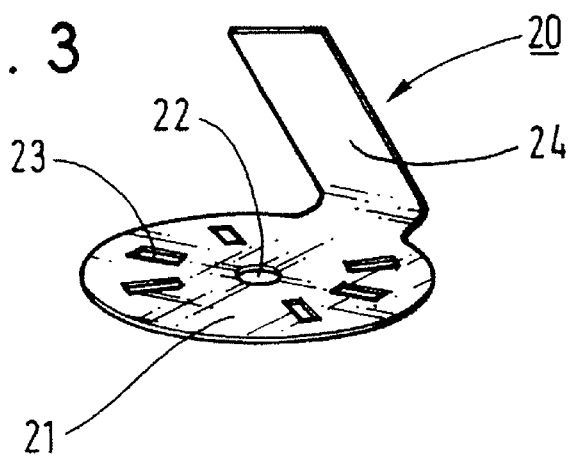
FIG. 3 is a perspective view of a collector from FIG. 2.

FIG. 2 shows a first embodiment of an electrical storage cell in accordance with the invention. The storage cell includes an electrical connection between the terminal and a positive electrode. A collector 20, shown in FIG. 3, comprises a conductive plane disk 21. The conductive disk 21 has a central orifice 22. The conductive disk 21 also has depressions 23 forming lips, with the additional advantage of facilitating impregnating the spool 7 with an electrolyte. The disk 21 is extended by a tongue 24 electrically connected to a lid 5 by welds 25. Multiple flexible conductive laminations 26 are electrically connected to the plane disk 21 of the collector 20, on the one hand, and to one end of the tongue 24, on the other hand, by respective welds 27 and 28.

Figure 4:
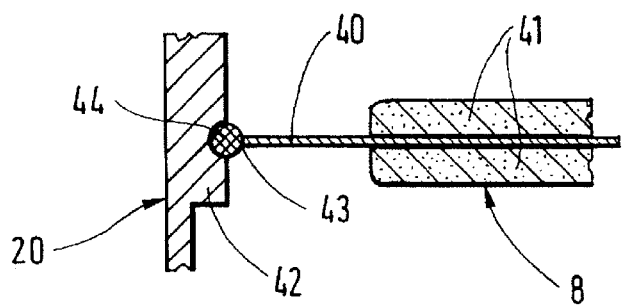
FIG. 4 is a view in section of the intersection between an electrode and the collector shown in FIG. 3.

As shown in FIG. 4, the positive electrode 8 includes a conductive support 40 each face of which is covered with a layer 41 containing an active material. The collector 20 is electrically connected to the positive electrode 8 by lips 42 formed by the depressions 23 cut into the thickness of the plane disk 21 of the collector 20. The lips 42 penetrate the edge 43 of the electrode, after which the lips 42 are connected to the edge 43 of the positive electrode 48 by an electrical weld 44.

The lid 5 is used as the positive terminal of the storage cell 1 and has a plane interior contact surface 29, for example. It can be made from nickel-plated steel. The collector 20 and the laminations 26 provide the electrical connection between the positive electrode 8 and the positive terminal 5. The collector can be made of nickel-plated steel. The laminations 26 can be made of nickel. The electrical connection between the collector 20 and the positive electrode 8 is made by an electrical weld.

The positive terminal 5 is therefore electrically connected to the collector 20 by a plurality of flexible conductive laminations 26. The laminations 26 are electrically connected to the plane part 21 of the collector 20 and cover that plane part at least partially. The laminations 26 can also cover the tongue 24 at least partially. The laminations are preferably based on nickel or nickel-plate steel; this improves their resistance to corrosion.

The flexibility of the laminations enables them to bend without damage when assembling the storage cell. The stacked laminations either reduce the bending force and the dimensions of the bend for a given current flow cross section or increase the current flow cross section for a given bending force.

Accordingly, when bending a part on a support, the minimum bending radius of curvature is approximately half the thickness of the part. The minimum distance between the two portions of the part, bent one over the other, is then equal to the thickness of the part. When bending superposed parts, the thickness of the innermost part determines the minimum bending radius of curvature. Furthermore, superposing n laminations of thickness e produces a significantly lower stiffness than that of a single lamination of thickness E equal to (n*e). The laminations can therefore be bent when sealing the lid without being damaged. The laminations 26 therefore preferably have a thickness less than that of the tongue 24, and more specially less than 0.25 mm.

Figure 5A:
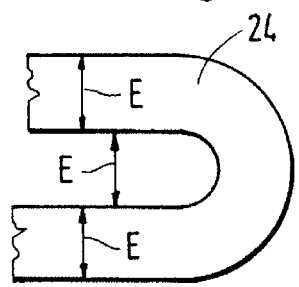
FIGS. 5A and 5B show bending into a U-shape of only a tongue, compared to bending into a U-shape of a tongue associated with laminations.

The first situation, i.e. that in which a given current flow cross section is fixed, is described in detail with reference to FIGS. 5A and 5B. In the case of a single tongue of thickness E, for example, which is bent into a U-shape, as shown in FIG. 5A, the distance between the bent portions is therefore E. The total height of the bend then has a value H=E+E+E. Accordingly, for E=1.1 mm, H=3.3 mm.

Figure 5B:
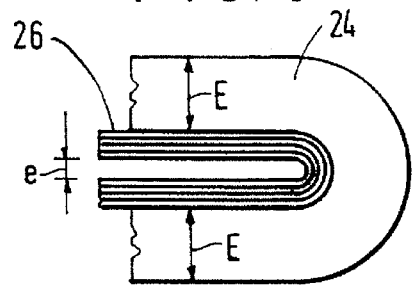

In the case of a tongue of thickness E' associated with n laminations of thickness e, as shown in FIG. 5B, the distance between the two portions is e. Thus the total height of the bend is H'=E'+ne+e+ne+E'=2E'+(2n+1)*e. Taking E'=0.3, e=0.1 and n=8 (which is equivalent to E'+ne=1.1 mm, i.e. a total thickness equivalent to the thickness of the tongue only), we obtain H'=2.3 mm. The height of the bend is therefore significantly reduced.

Figure 6A:
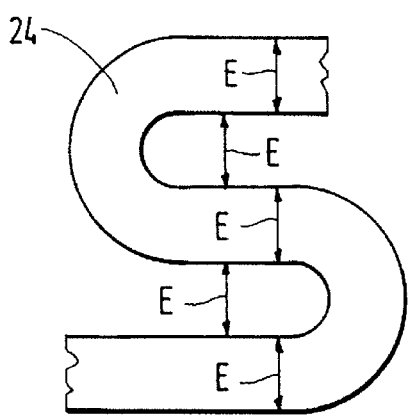
FIGS. 6A and 6B show bending into an S-shape of only a tongue, compared to bending into an S-shape a tongue associated with laminations.
Figure 6B:
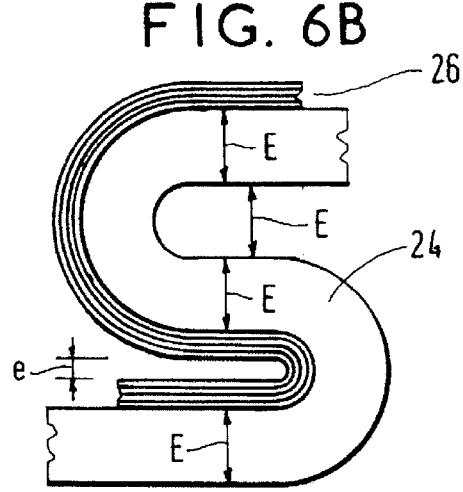

The bend heights can also be compared in the case of bending to an S-shape. By applying the preceding minimum radius rule to a single tongue of thickness E=1.1 mm, such as the tongue shown in FIG. 6A, a height H=5E=5.5 mm is obtained in this example.

Applying the preceding formulas to a tongue of thickness E associated with n laminations, a height H'=4E'+(3n+1)*e is obtained. Taking E'=0.3 mm, e=0.1 mm and n=8 (which is again equivalent to E'+ne=1.1 mm, i.e. a total thickness equivalent to the thickness of the tongue only), we obtain H'=3.7 mm.

It can therefore be deduced from the above considerations that bending a tongue surmounted by n laminations has a bend height less than that of a tongue only of equivalent total thickness. The overall size of the storage cell can therefore be reduced. The connection can in particular have a bending radius of curvature less than the bending radius of curvature of a connecting part having the same thickness as the disk of the collector.

Figure 7:
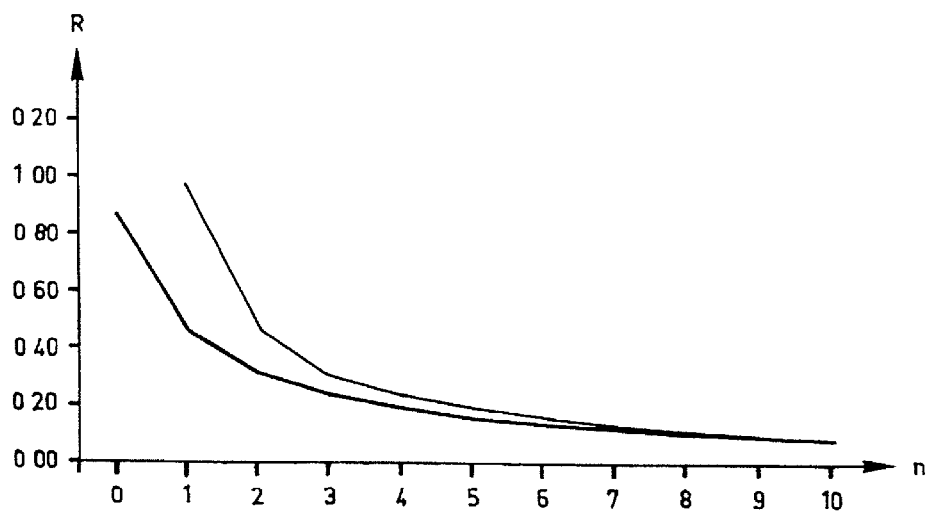
FIG. 7 shows a curve comparing the impedance of laminations associated with a tongue or not, with the impedance R in milliohms plotted on the ordinate axis and the number of laminations plotted on the abscissa axis.

In the second case, the flexibility limits the bending force. Thus increasing the current flow cross section does not compromise the assembly of the storage cell. The current flow cross section can therefore be increased in proportion to the number of laminations, as shown in FIG. 7. FIG. 7 shows the influence of the number of laminations on the impedance. The electrical resistance R being inversely proportional to the current flow cross section for a given material, using a large number of laminations reduces the electrical resistance whether the electrode is connected to the terminal. Depending on the number of laminations, it has been found that in practice 90 to 95% of the current flows in the laminations.

It is preferable to use laminations more than 0.05 mm thick to obtain sufficient mechanical strength to withstand bending. This thickness also allows the use of a basic strip of acceptable cost. For strip thicknesses less than 0.2 mm, the cost of strip increases in inverse proportion to its thickness.

The laminations are preferably superposed to reduce their overall size within the storage cell. The number of laminations defines the thickness of the superposed laminations as a function of the space available inside the storage cell. In industrial production it is therefore a simple matter to vary the thickness of the superposed stack and to use laminations of identical thickness to fabricate different types of storage cell.

In the embodiment previously described, a tongue electrically connecting the collector to the terminal is retained. This tongue can also be more rigid than any of the laminations because the dimensions of the tape used are in accordance with the electrical connection to the positive electrode 8, if the aim is to improve the connection of the collector 20 to the positive electrode 8. The tongue can also be more rigid than that of the superposed laminations. The tongue also facilitates the electrical connection of all of the laminations 26 to the lid 5. This assembly is described in more detail later.

In another variant, the lid 5 can be connected to the collector 20 without using any tongue 24. Thus it is possible to use only attached laminations 26 to provide the electrical connection of the collector 20 to the lid 5.

The electrical and mechanical connections are preferably made by welding. The multiple laminations can thus be connected to the plane portion of the collector in this way. Welds passing not only through the thickness of the collector but also through the thicknesses of the laminations can be used. The assembly comprising the tongue 24 and the laminations 26 is electrically connected to the lid 5 by welds. These welds also preferably pass not only through the thickness of the collector but also through those of the laminations. These through-welds improve electrical conduction and reliability in terms of mechanical strength.

The invention also relates to a method of assembling a positive electrode collector according to the invention. As previously described, the collector can be preassembled with the laminations by electrical welds. The collector and the laminations are positioned and gripped between a shaping counter-electrode. This shaping counter-electrode avoids pressure on the weld lips but allows face-to-face bearing of the areas to be welded. A pointed electrode is then applied to the areas to be welded and a weld current is generated between the electrode and the counter-electrode. This method produces through-welds at the lowest cost.

A variant welds the collector to the edge of the electrode and then welds the laminations.

Another variant of the preassembly principle uses a laser beam to weld the laminations. With this method the number of spot welds connecting the collector to the laminations can be increased, if necessary. This method also provides a reliable weld at each spot weld. When the collector has been assembled, it is electrically welded to the spool. The collector and the laminations are virtually split in two along their axis to provide electrical isolation of the two parts. Only a few areas of very small cross section, usually referred to as "fusible points", remain to provide the mechanical strength of the two parts. Two symmetrical electrodes are then applied to each half-part and a welding current is passed between the two collector half-parts. The current melts the fusible points and then passes through the lips of the collector and through the edge of the electrode. The interfaces between the lips of the collector and the edge of the electrode are then melted by the electrical resistance heating effect.

One the collector has been connected to the electrode, the spool assembly is inserted into the container and the lid forming the positive terminal is then joined to the combination of the tongue and the laminations.

When bending to an S-shape a collector including a tongue, the assembly described above is positioned in front of the lid in the following manner: the laminations are contained between the tongue and the lid. The S-bend is obtained by forming a bend at the junction between the plane area of the collector and the tongue and then another bend in the opposite direction between the connection to the lid of the tongue and the first bend. This bending is preferable in some cases because of the overall size of the lid. The reliability of the bending is also improved. The laminations are then placed between thicker walls. This improves the quality of the weld. The weld is made by pressing a welding electrode onto the assembly comprising the tongue, the laminations and the lid. This assembly is pressed against a counter-electrode. A welding current is then passed between the two electrodes. The tongue, which is thicker than each of the laminations, is in contact with the electrode. Because of this greater thickness, it is possible for a higher current density to flow during welding, without damaging the area in contact with the electrode. This improves the reliability of the weld. Furthermore, the core that is melted during welding is positioned over all the thicknesses.

Figure 8:
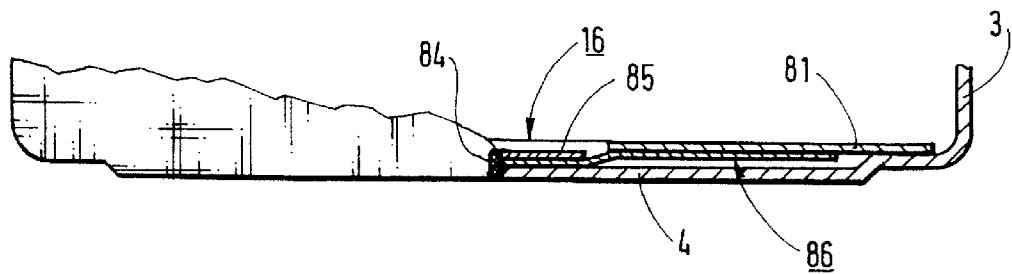
FIG. 8 is a partial section taken along the line A-B of an electrical storage cell according to the invention.

The electrical and mechanical connections at the negative terminal are described next. The negative electrode 9 is connected to the collector 16. The collector 16 of the negative electrode 9, shown in FIGS. 8 and 9, includes two plates 80 and 81 electrically isolated in the areas connected to the electrode 9. The plate 80 has a central cut-out 80. In the FIG. 9 example, the plates are connected to the electrode 9 at depressions 82 with lips. The plates 80 and 81 are electrically interconnected by an eccentric tongue 83. The tongue 83 is necessary to provide the mechanical connection of the two plates 80 and 81 when connecting the collector 16. In this way an electrical resistance is obtained between the plates 80 and 81 that is higher than the resistance to flow via the edge of the negative electrode 9. This facilitates welding the collector 16 to the negative electrode 9. Also, when the bundle of electrodes 7 is placed in the container 2, an electric weld 84 is made to improve the electrical connection between the bottom 4 of the container 2 and the collector 16. This so-called "bottom" weld electrically connects only the plate 80, because it is connected directly to the central cut-out 5.

Figure 9:
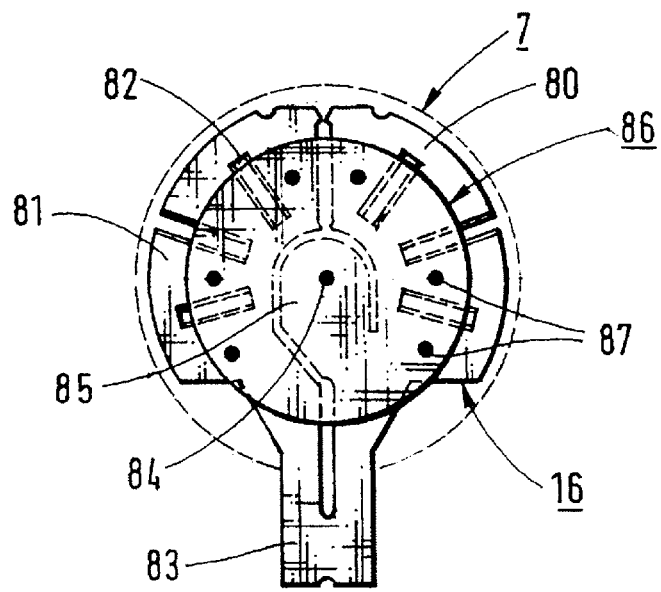
FIG. 9 is a top view of a negative terminal collector of one embodiment of a storage cell.

A disk-shaped bridge 86 shown shaded in FIG. 9 is then connected. This bridge re-establishes an electrical connection between the connection areas of the plates 80 and 81 and reduces the electrical resistance of the collector 16. When the collector 16 is connected to the electrode 9 and to the negative terminal 4, the bridge 86 is electrically connected to the areas 80 and 81 on either side. The voltage drop in service between the electrode and the terminal is then reduced. Also, the bridge is welded directly to the bottom of the container 4 by the bottom weld 84. The bridge 86 can also be welded simultaneously with the central cut-out 85. It is preferably assembled to the plates 80 and 81 by welds 87. The bridge 86 is preferably made of nickel or nickel-plate steel to have a low impedance. It can be made from nickel strip cut to shape, for example. Strips 0.2 mm thick are particularly suitable for making the bridge.

Figure 10:
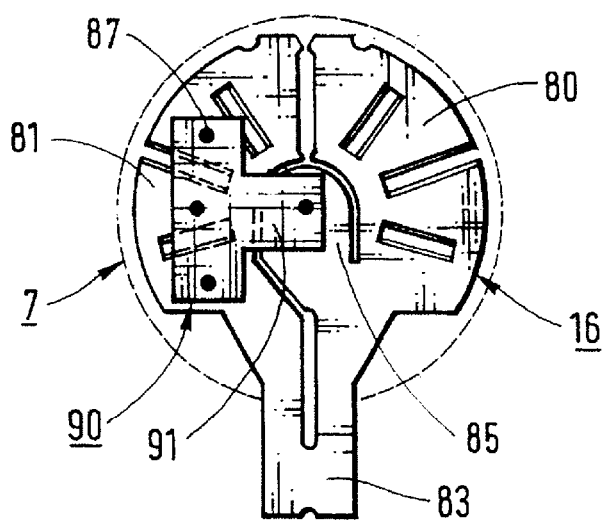
FIG. 10 is a top view of a negative terminal collector of a different embodiment of a storage cell.

As shown in FIG. 10, it is equally possible to assemble a T-shaped half-bridge 90 connecting the connection area of the plate 81 to the central cut-out. The bridge is preferably assembled to the collector 16 before connecting the collector 16 and the electrode 9. This produces a collector provided with a strip bridge and makes the electrical connection in one operation. The half-bridge 90 is assembled to the collector. The central part 91, facing the central cut-out 85 of the collector 16, is raised so that it does not touch the central cut-out 85. This prevents short circuits while welding the collector to the electrode 9. The central part 91 is then connected to the bottom of the container 4 during the production of the bottom weld 84.

Figure 11:
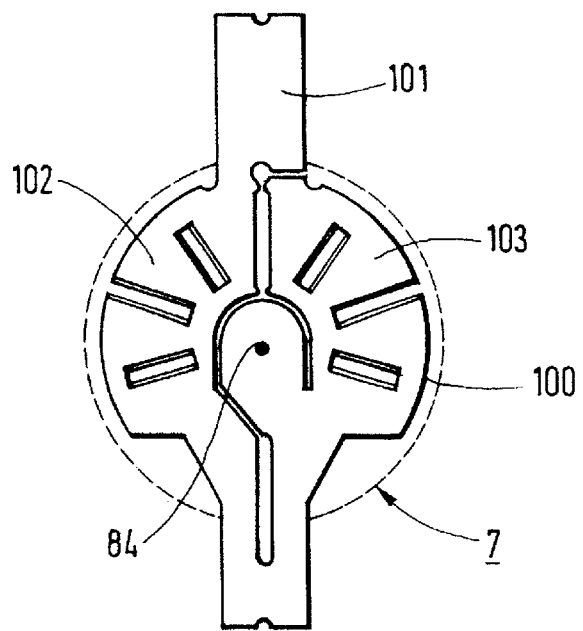
FIG. 11 is a top view of a negative terminal collector of a further embodiment of a storage cell.

FIG. 11 shows a variant of the bridge. Here the bridge is an integral part of the collector 100. The bridge then takes the form of a bridging lug 101 projecting from a first connecting plate. When assembling the connector to the bundle of electrodes, the bridging lug 101 is bent over the collector 100 itself. When making the bottom weld 84, the bridging lug 101 is welded to the portion of the plate 102 of the collector 100 and to the bottom 4 of the container 2, so connecting the two plates 102 and 103 of the collector 100.

The negative collector is assembled in a comparable fashion. The negative half-bridge 90 is pre-assembled to the collector on the side of the part 81 with a plurality of spot electrical or laser welds. The part 91 situated over the central area 85 of the collector is then raised. Two symmetrical electrodes are then applied, practically covering the areas 80 and 81, and a welding current is generated. The current melts the fusible points that were holding the parts 80 and 81 together and then causes welding of the contact areas between the lips of the collector 16 and the edge of the negative electrode 9. The spool 7 is then introduced into the container 2. A long thin electrode is then placed at the core of the spool 7 to weld the cut-out central part 85 of the collector 16 and the facing part 91 of the half-bridge 90 to the bottom 4 of the container 2.

In the FIG. 9 example, the complete bridge is welded after assembling the negative collector to the negative electrode. The bridge is welded by passing current between an electrode, for example a thin electrode, bearing on the bridge, and a counter-electrode bearing on the collector around the bridge without touching it. This welding method therefore utilizes the rigidity of the parts to be welded to compensate the welding force. The counter-electrode is not placed in front of the electrode: this type of welding is known as blind welding. In a similar fashion, the bottom weld assembles the container bottom, the bridge and the collector.

A complete assembly comprising a positive electrode and a negative electrode each fitted with its collector produces storage cells having a discharge voltage of the order of 0.75 volt at 300 A after 3 seconds. Preliminary tests with standard storage cells indicated a voltage of the order of 0.5 volt.

Figure 12:
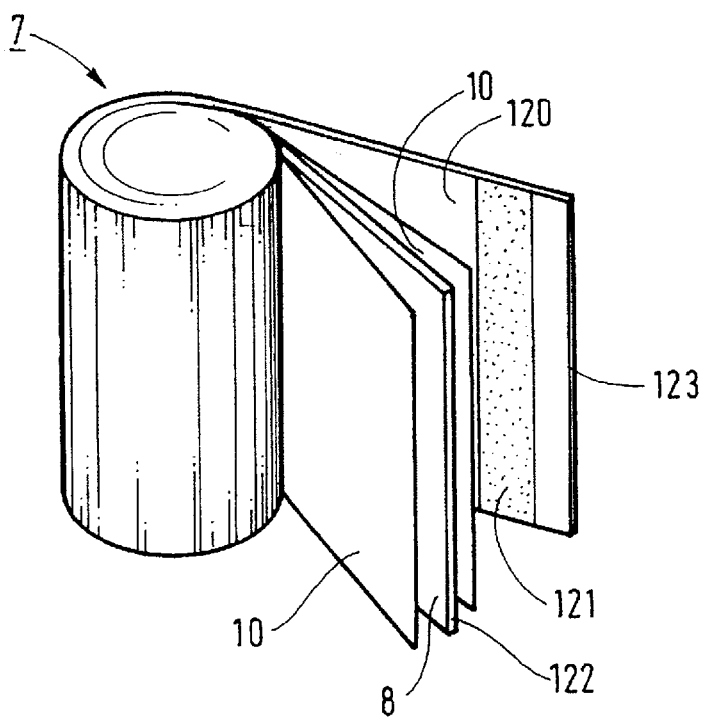
FIG. 12 is a partial view of a spool of one particular embodiment of an electrical storage cell according to the invention.

The invention also relates to a negative electrode structure of the above kind of storage cell. FIG. 12 shows one embodiment of this kind of structure according to the invention. A positive electrode 8 and a negative electrode 120 are wound in a spiral, with a separator 10 under each of them, to form a spool 7. The separators 10 avoid contact between the electrodes of different polarity in the winding. The negative electrode 120 is disposed toward the outside of the winding. At the end of the winding, corresponding to the outside or to the periphery of the spool 7, the positive electrode 8 is extended beyond the first separator 10 inserted between the two electrodes. The separator 10 is extended beyond the positive electrode 8. A reinforcement 121, preferably an electrically insulative adhesive, is disposed on the internal face of the negative electrode exactly facing the edge 122 of the positive electrode. The reinforcement 121 is for protecting the area of the negative electrode 120 that it covers against damage caused by the edge 122 of the positive electrode 8. The damage is generally due to burrs left by cutting the positive electrode 8 which, after wearing away the separator 10, eventually reach the negative electrode 120. This causes short circuits when the separator 10 is perforated by the edge 122 of the positive electrode 8. By reinforcing the respective isolation of the electrodes 8 and 120, the part 121 reduces the risk of short circuits between the electrodes. The height of the reinforcing part 121 is preferably chosen to be substantially equal to the height of the negative electrode 120.

The reinforcement 121 can have the following characteristics: a thickness from 20 to 150 µm, a width from 2 to 12 mm, and an offset relative to the end 123 of the negative electrode from 0 to 12 mm.

In a variant of the invention, the separators are reinforced at the start of the winding, i.e. near the center of the spool. This reinforcement is obtained by adding an additive to the separator that is thinner than the separator. A thin additive of this kind reinforces the separator whilst occupying a small volume. A highly compact storage cell spool can therefore be retained whilst reinforcing the separator film. The additive can take the form of a film of a material identical to that used for the separator. A 100 µm thick additive can be used with a 125 µm thick separator, for example.

The above embodiments and examples must be considered as having been described by way of non-limiting illustration, and the invention is not intended to be limited to the details supplied here, but to be open to modifications within the scope of the appended claims.

What is claimed is:

1. An electrical storage cell including:
   a positive terminal and a negative terminal,
   a positive electrode electrically connected to the positive terminal,
   a negative electrode electrically connected to the negative terminal, and
   a collector of a first polarity having:
      a plane part electrically connected to one of said positive and negative electrodes, and
      flexible electrical connection means connecting said plane part to one of said positive and negative terminals of said first polarity and having a minimum radius of curvature for bending on a support less than that of a part having the same thickness as the plane part of the collector,
   wherein said electrical connection means comprise a plurality of superposed flexible conductors electrically connecting said collector to said terminal of the first polarity, and
   wherein each flexible conductor has a thickness less than the average thickness of the plane part of the collector.

2. An electrical storage cell according to claim 1, wherein the flexible conductors are in the form of laminations.

3. An electrical storage cell according to claim 1, wherein each flexible conductor has a thickness from 50 to 250 micrometers.

4. An electrical storage cell according to claim 1, wherein the flexible conductors are made of nickel or nickel-plated steel.

5. An electrical storage cell according to claim 1, wherein the flexible conductors are bent to an S-shape.

6. An electrical storage cell according to claim 1, wherein the collector further includes a tongue projecting from its plane part.

7. An electrical storage cell according to claim 6, wherein the tongue is more rigid than each flexible conductor.

8. An electrical storage cell according to claim 6, wherein the flexible conductors (26) are welded on the one hand to the plane (21) of the collector and on the other hand to one end of the tongue (24).

9. An electrical storage cell according to claim 1, further including a collector of a second polarity electrically connected to the other of said positive and negative electrodes having the second polarity and having a tongue electrically connecting it to the terminal of the second polarity.

10. An electrical storage cell according to claim 9, wherein the collector of the second polarity comprises two plates each having an area of connection with the electrode of the second polarity and said two plates are electrically isolated from each other in their connection areas.

11. An electrical storage cell according to claim 9, wherein the collector of the second polarity comprises two plates each having an area of connection with the electrode of the second polarity and said two plates are electrically connected by a connection having an electrical resistance greater than the connection of the plates via the electrode of the second polarity.

12. An electrical storage cell according to claim 11, wherein said plates are connected by a tongue.

13. An electrical storage cell according to claim 10, wherein a bridge electrically connects the connection areas of the plates.

14. An electrical storage cell according to claim 10, wherein a bridge electrically connects one plate to a central cut-out in the other plate.

15. An electrical storage cell according to claim 13, wherein the bridge is a projection (101) on a plate (102) that is bent and electrically connected to the other plate (103).

16. An electrical storage cell according to claim 1, wherein the first polarity is positive.

17. An electrical storage cell including:
- a positive terminal and a negative terminal,
- a positive electrode electrically connected to the positive terminal,
- a negative electrode electrically connected to the negative terminal, and
- a collector of a first polarity having:
  - a plane part electrically connected to one of said positive and negative electrodes,
  - flexible electrical connection means connecting said plane part to one of said positive and negative terminals of said first polarity and having a minimum radius of curvature for bending on a support less than that of a part having the same thickness as the plane part of the collector, and
  - a tongue projecting from its plane part,
- wherein the flexible conductors are welded on the one hand to the plane part of the collector and on the other hand to one end of the tongue.

18. An electrical storage cell including:
- a positive terminal and a negative terminal,
- a positive electrode electrically connected to the positive terminal,
- a negative electrode electrically connected to the negative terminal, and
- a collector of a first polarity having:
  - a plane part electrically connected to one of said positive and negative electrodes, and
  - flexible electrical connection means connecting said plane part to one of said positive and negative terminals of said first polarity and having a minimum radius of curvature for bending on a support less than that of a part having the same thickness as the plane part of the collector,
- further including a collector of a second polarity electrically connected to the electrode of the second polarity and having a tongue electrically connecting it to the terminal of the second polarity, wherein the collector of the second polarity comprises two plates each having an area of connection with the electrode of the second polarity and said two plates are electrically isolated from each other in their connection areas.

19. An electrical storage cell including:
- a positive terminal and a negative terminal,
- a positive electrode electrically connected to the positive terminal,
- a negative electrode electrically connected to the negative terminal, and
- a collector of a first polarity having:
  - a plane part electrically connected to one of said positive and negative electrodes, and
  - flexible electrical connection means connecting said plane part to one of said positive and negative terminals of said first polarity and having a minimum radius of curvature for bending on a support less than that of a part having the same thickness as the plane part of the collector,
- further including a collector of a second polarity electrically connected to the electrode of the second polarity and having a tongue electrically connecting it to the terminal of the second polarity, wherein the collector of the second polarity comprises two plates each having an area of connection with the electrode of the second polarity and said two plates are electrically connected by a connection having an electrical resistance greater than the connection of the plates via the electrode of the second polarity.

20. An electrical storage cell according to claim 19, wherein said plates are connected by a tongue.

21. An electrical storage cell according to claim 18, wherein a bridge electrically connects the connection areas of the plates.

22. An electrical storage cell according to claim 18, wherein a bridge electrically connects one plate to a central cut-out in the other plate.

23. An electrical storage cell according to claim 21, wherein the bridge is a projection on a plate that is bent and electrically connected to the other plate.

24. An electrical storage cell including:
- a positive terminal and a negative terminal,
- a positive electrode electrically connected to the positive terminal,
- a negative electrode electrically connected to the negative terminal, and
- a collector of a first polarity having:
  - a plane part electrically connected to one of said positive and negative electrodes, and
  - flexible electrical connection means connecting said plane part to one of said positive and negative terminals of said first polarity and having a minimum radius of curvature for bending on a support less than that of a part having the same thickness as the plane part of the collector,
- wherein said electrical connection means comprises a plurality of superposed flexible conductors electrically connecting said collector to said terminal of the first polarity, and wherein at least one of said plurality of flexible conductors has a thickness less than the average thickness of the plane part of the collector.

25. An electrical storage cell including:

a positive terminal and a negative terminal, a positive electrode electrically connected to the positive terminal, a negative electrode electrically connected to the negative terminal, and a collector of a first polarity having:
- a plane part electrically connected to one of said positive and negative electrodes, and
- a flexible electrical connector which connects said plane part to one of said positive and negative terminals of said first polarity and having a minimum radius of curvature for bending on a support less than that of a part having the same thickness as the plane part of the collector, wherein said electrical connector comprises a plurality of superposed flexible conductors electrically connecting said collector to said terminal of the first polarity, and wherein at least one of said plurality of flexible conductors has a thickness less than the average thickness of the plane part of the collector.

* * * * *